United States Patent [19]
Konishi

[11] Patent Number: 5,535,113
[45] Date of Patent: Jul. 9, 1996

[54] CONTROL EQUIPMENT FOR HIGH VOLTAGE DIRECT CURRENT TRANSMISSION SYSTEM WITH EQUIPMENT OF SELF-COMMUTATED CONVERTER

[75] Inventor: Hiroo Konishi, Katsuta, Japan

[73] Assignee: Hitachi, Ltd., Tokyo, Japan

[21] Appl. No.: 11,352

[22] Filed: Jan. 29, 1993

[30] Foreign Application Priority Data

Jan. 30, 1992 [JP] Japan ................................ 4-015012

[51] Int. Cl.⁶ .................... H02J 3/38; H02M 5/45
[52] U.S. Cl. ........................................ 363/35; 363/37
[58] Field of Search .................... 363/34, 35, 37, 363/51, 78, 79, 85–87, 96, 135–138; 323/205, 207

[56] References Cited

U.S. PATENT DOCUMENTS

| | | | |
|---|---|---|---|
| 4,649,466 | 3/1987 | Rogowsky | 363/35 |
| 4,689,733 | 8/1987 | Guth et al. | 363/51 |
| 4,769,751 | 9/1988 | Schraudolph et al. | 363/35 |
| 4,797,799 | 1/1989 | Inokuchi et al. | 363/37 |
| 4,837,671 | 6/1989 | Wild et al. | 363/35 |
| 4,862,340 | 8/1989 | Inokuchi | 363/35 |
| 5,396,411 | 3/1995 | Konishi et al. | 363/37 |
| 5,414,612 | 5/1995 | Bjorklund et al. | 363/35 |

FOREIGN PATENT DOCUMENTS

| | | | |
|---|---|---|---|
| 316804 | 11/1988 | European Pat. Off. | G05F 1/70 |
| 312823 | 12/1988 | European Pat. Off. | H02J 3/36 |
| 367247 | 10/1989 | European Pat. Off. | H02J 3/36 |

OTHER PUBLICATIONS

Y. Tokiwa, "Application of a Digital Instantaneous Current for Static Induction Thyrristor Converters in the Utility Line," PCIM '88 Proceedings III, pp. 344–346.

Primary Examiner—Matthew V. Nguyen
Attorney, Agent, or Firm—Antonelli, Terry, Stout & Kraus

[57] ABSTRACT

A high voltage dc transmission system uses equipment of self-commutated converters each of which comprises switching devices with a self-commutating (gate-turn-off) function. A first control equipment associated with the rectifier comprises a constant reactive power (var) control circuit for holding constant the reactive power on the input side of the rectifier, and a constant dc voltage control circuit for holding constant the dc system voltage on the output side thereof. A second control equipment associated with the inverter comprises a constant reactive power control circuit for holding constant the reactive power on the output side of the inverter, and a constant active power control circuit for holding constant the active power on the output side thereof. The first control equipment and the second control equipment each have a current control circuit for making independent control of each component of a two-phase current resulted from transformation of a three-phase ac current.

17 Claims, 7 Drawing Sheets

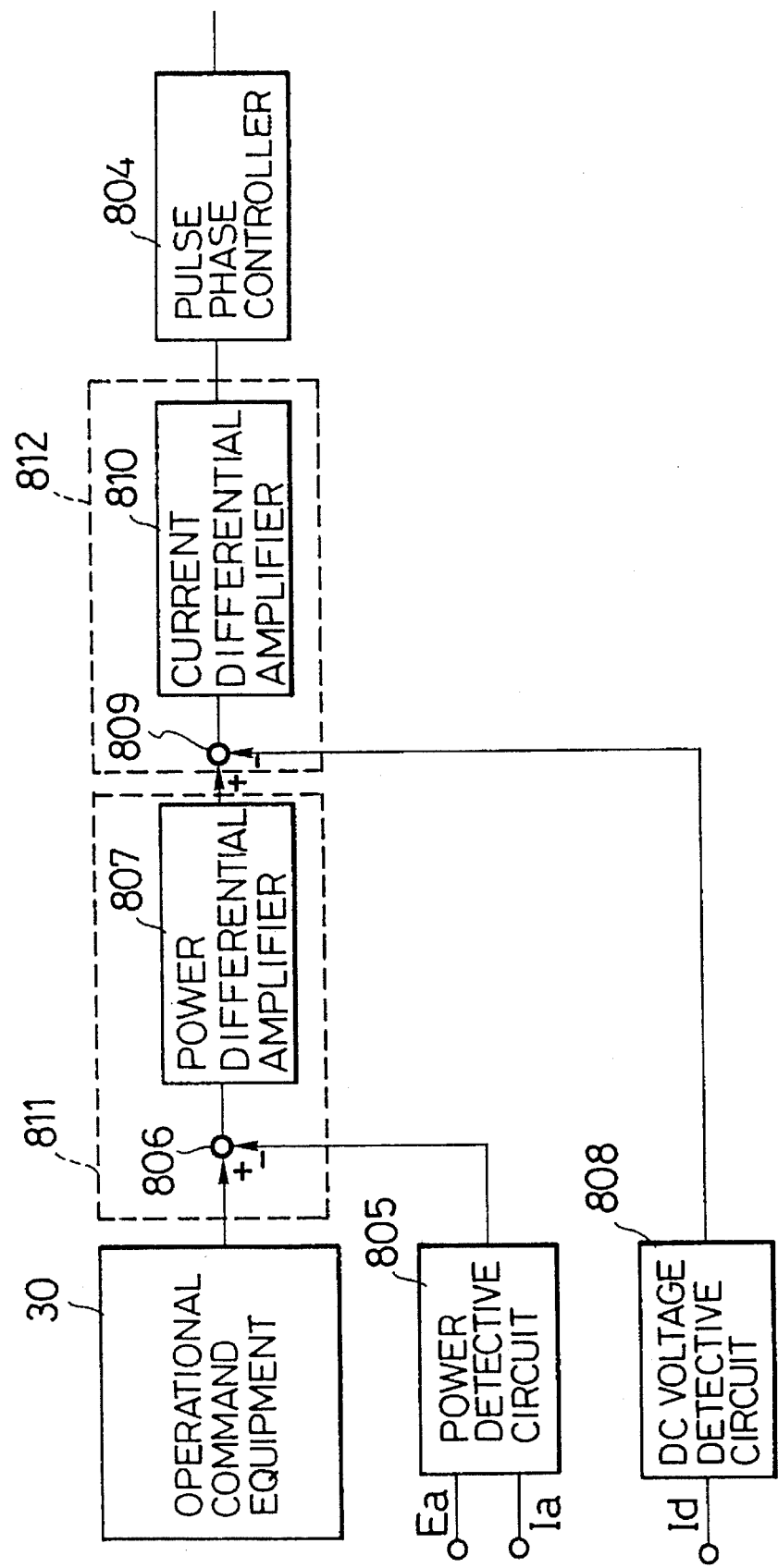

5,535,113

CONTROL EQUIPMENT FOR HIGH VOLTAGE DIRECT CURRENT TRANSMISSION SYSTEM WITH EQUIPMENT OF SELF-COMMUTATED CONVERTER

BACKGROUND OF THE INVENTION

The present invention relates to a control equipment for a high voltage direct current (dc) transmission system. There has been developed application of switching devices with a self-cummutaing (gate-turn-off) function to equipment of large-capacity power converters such as a high voltage dc transmission system (HVDC), static var compensator (SVC), and CVCF (power source of constant voltage constant frequency). Among these attempts, a control system for an equipment of self-commutated converter, which is one application form of such switching devices to the high voltage dc transmission system, has been studied.

Equipment of self-commutated converter generally operates as voltage sources. In the event the line voltage is abruptly changed upon the occurrence of an ac system fault, therefore, if the converter voltage is not changed correspondingly, an accident may happen because a current flows depending on the difference between the ac system voltage and the output voltage of the converter equipment. Thus, the current may exceed an allowable value of the converter equipment and the converter equipment may be damaged in some cases. To obtain a current control system with quick response as a means for preventing such an accident, a control system for making independent vector control per phase of a two-phase current resulted from transform of a three-phase alternating current (ac) has been proposed Y. Tokiwa, et al, "Application of a digital instantaneous current control for static induction thyristor converters in the utility line", PCIM '88 Proceedings.

A high voltage dc transmission system comprises a rectifier for converting an ac power to a dc power and an inverter for converting a dc power to an ac power. Although these rectifier and inverter are required to be operated in cooperation to stably and efficiently operate the high voltage dc transmission system comprising equipment of self-commutated converters, no considerations have been paid to this point in the above conventional control system.

SUMMARY OF THE INVENTION

An object of the present invention is to provide a control equipment for a high voltage dc transmission system which can operate the high voltage dc transmission system stably and efficiently.

To achieve the above object, in accordance with one form of the present invention, a first equipment of self-commutated converter and a second equipment of self-commutated converter, each of which comprises switching devices with a self-commutating (gate-trun-off) function, are respectively used as a rectifier and an inverter in high voltage dc transmission system.

A control equipment for the first equipment of self-commutated converter includes first control means for holding the dc voltage of a dc circuit on the output side or the active power of an ac system on the input side, and the reactive power or the line voltage of the ac system on the input side at specified values.

A control equipment for the second equipment of slef-commutated converter includes second control means for holding the active power of an ac system on the output side or the dc voltage of the dc system on the input side, and the reactive power or the line voltage of the ac system on the output side at specified values.

The first and second control means each have current control means for making independent control of each component of a two-phase current resulted from transformation of three-phase ac current or a three-phase ac voltage and a three-phase ac current, or a current equivalent to the transformed two-phase current.

In accordance with another form of the present invention, the rectifier is constituted by an equipment of line-commutated converter and the inverter is constituted by an equipment of self-commutated converter which comprise switching devices with a self-commutating function.

First control means for the equipment of line-commutated converter associated with the rectifier makes control to hold the dc voltage of a dc system on the output side or the active power of an ac system on the input side at a specified value.

Second control means for the equipment of self-commutated converter associated with the inverter makes control to hold the active power of an ac system on the output side or the dc voltage of the dc system on the input side, and the reactive power or the line voltage of the ac system on the output side at specified values.

The second control means has current control means for making independent control of each component or a two-phase current resulted from transformation of three-phase ac current or a three-phase ac voltage and a three-phase ac current, or a current equivalent to the transformed two-phase current.

Operation of the control equipment of the present invention with the above construction will be briefly described. The equipment of self-commutated converter can control the turn-on timing and the turn-off riming as desired and, therefore, control the reactive power and the dc voltage or the active power of the converter equipment independently of each other.

Control of the reactive power is effected by using an output of reactive power (var) control means for holding the reactive power at a specified value, as s current command value for one current control means of the current resulted from the three-phase to two-phase transformation. On the other hand, control of the dc voltage or the active power is effected by using an output of voltage control means for holding the dc voltage at a specified value or an output of active power control means for holding the active power at a specified value, as a current command value for the other current control means.

The first control means for the rectifier is given with a constant dc voltage control function of holding the dc voltage of the dc system on the output side, and a constant var control function of holding the reactive power of the ac system on the input side. The second control means for the inverter is given with a constant active power control function and a constant var control function of holding the active power and the reactive power of the ac system on the output side, respectively.

Now, when the active power on the output side of the inverter increases, the dc system voltage is lowered. On the other hand, to hold the dc voltage constant, the rectifier takes in active power from the ac system on the input side of the rectifier based on the constant dc voltage control function. Thus, the rectifier and the inverter are operated in a cooperative manner to stably operate the high voltage dc transmission system. Furthermore, since the equipment of self-commutated converter can independently control the reactive power of the ac system regardless of the active power and dc voltage, the high voltage dc transmission system can be operated with high efficiency.

BRIEF DESCRIPTION OF THE DRAWINGS

FIG. 7 is a block diagram showing the construction of another embodiment of the control equipment for the line-commutated rectifier shown in FIG. 5.

Other objects and features of the present invention will be apparent from the following description of embodiments.

DESCRIPTION OF THE PREFERRED EMBODIMENTS

Figure 1:
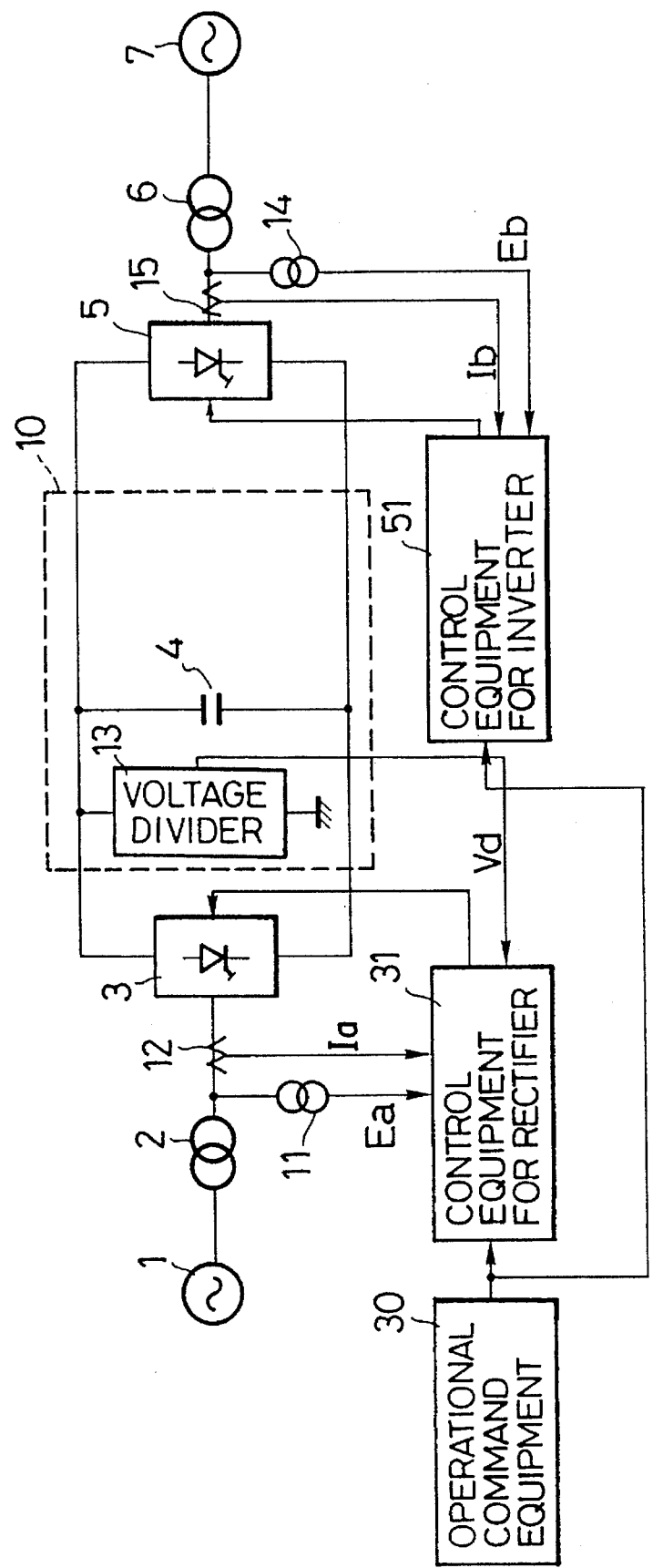
FIG. 1 is a block diagram showing the construction of one embodiment of a high voltage dc transmission system provided with equipment of self-commutated converters to which the present invention is applied.

FIG. 1 shows that the construction of one embodiment of a high voltage dc transmission system provided with equipment of self-commutated converters to which the present invention is applied. In FIG. 1, denoted by reference numeral 1 is an ac system, 2 is a converter transformer, 3 is a rectifier for converting an ac power to a dc power, 4 is a capacitor for a dc system 10, 5 is an inverter for converting a dc power to an ac power, 6 is a converter transformer, 7 is another ac system, 30 is an operational command equipment for issuing operational commands to both the rectifier and the inverter of the high voltage dc transmission system, 31 is a control equipment for the rectifier 3, and 51 is a control equipment for the inverter 5. An ac voltage Ea and an ac current Ia of the ac system 1 are measured by a voltage transformer 11 and a current transformer 12, respectively, and adc voltage Vd of the dc system 10 is measured by a voltage divider 13, the measured signals being input to the control equipment 31 for the rectifier 3. On the other hand, an ac voltage Eb and an ac current Ib of the ac system 7 are measured by a voltage transformer 14 and a current transformer 15, respectively, and the measured signals are input to the control equipment 51. Based on those input signals, the control equipment 31 and 51 operate the rectifier and the inverter of the high voltage dc transmission system in cooperation.

Figure 2:
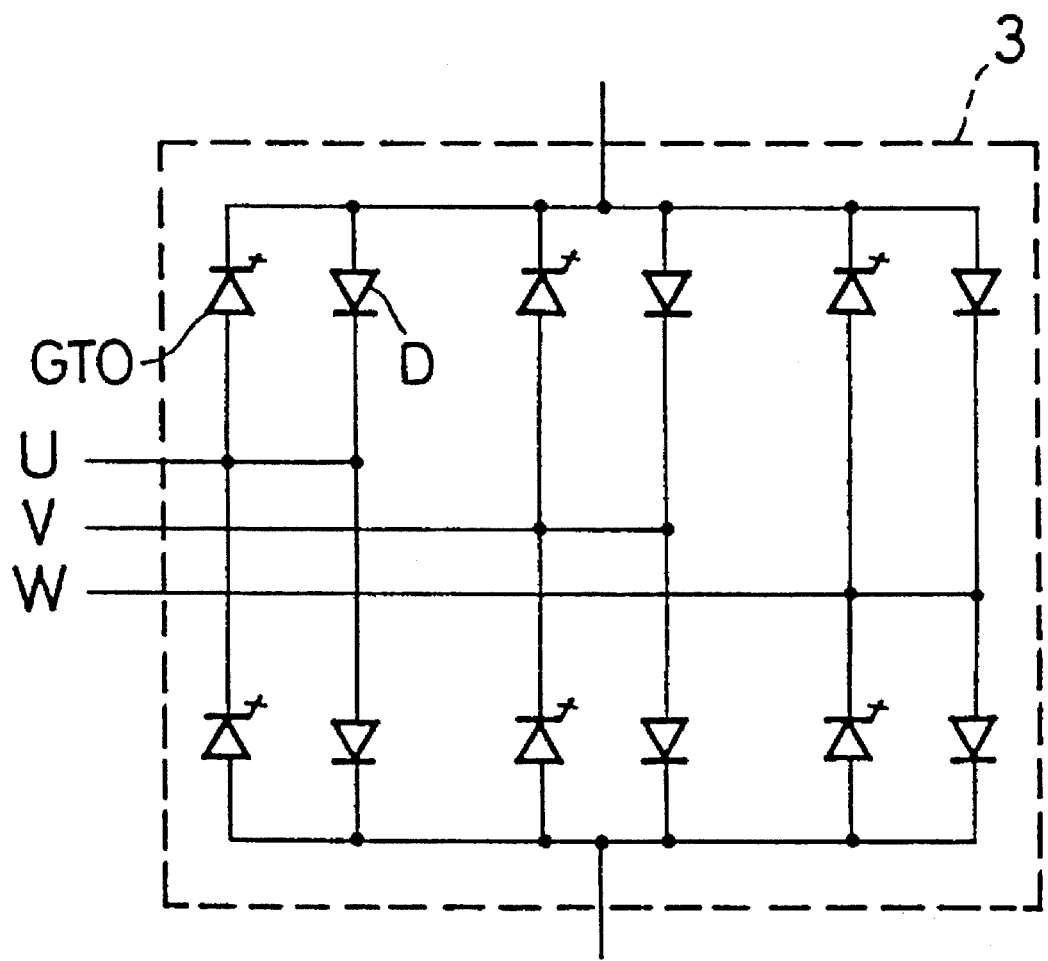
FIG. 2 is a circuit diagram showing the construction of one equipment of self-commutated converter shown in FIG. 1.

The rectifier 3 and the inverter 5 are each constituted as an equipment of self-commutated converter comprising devices with a self-commutating (gate-turn-off) function. An example of the construction of the rectifier thus constituted is shown in FIG. 2. Referring to FIG. 2, denoted by reference symbols GTO is a gate turn-off thyristor with s self-commutating function and D is a diode. The converter equipment is constituted by connecting portions of GTO's and D's in a three-phase bridge, each portion of GTO and D being connected in parallel with polarities reversed. The control equipment 31 and the control equipment 51 have the same construction except that command values for current control circuit described later are different from each other.

Figure 3:
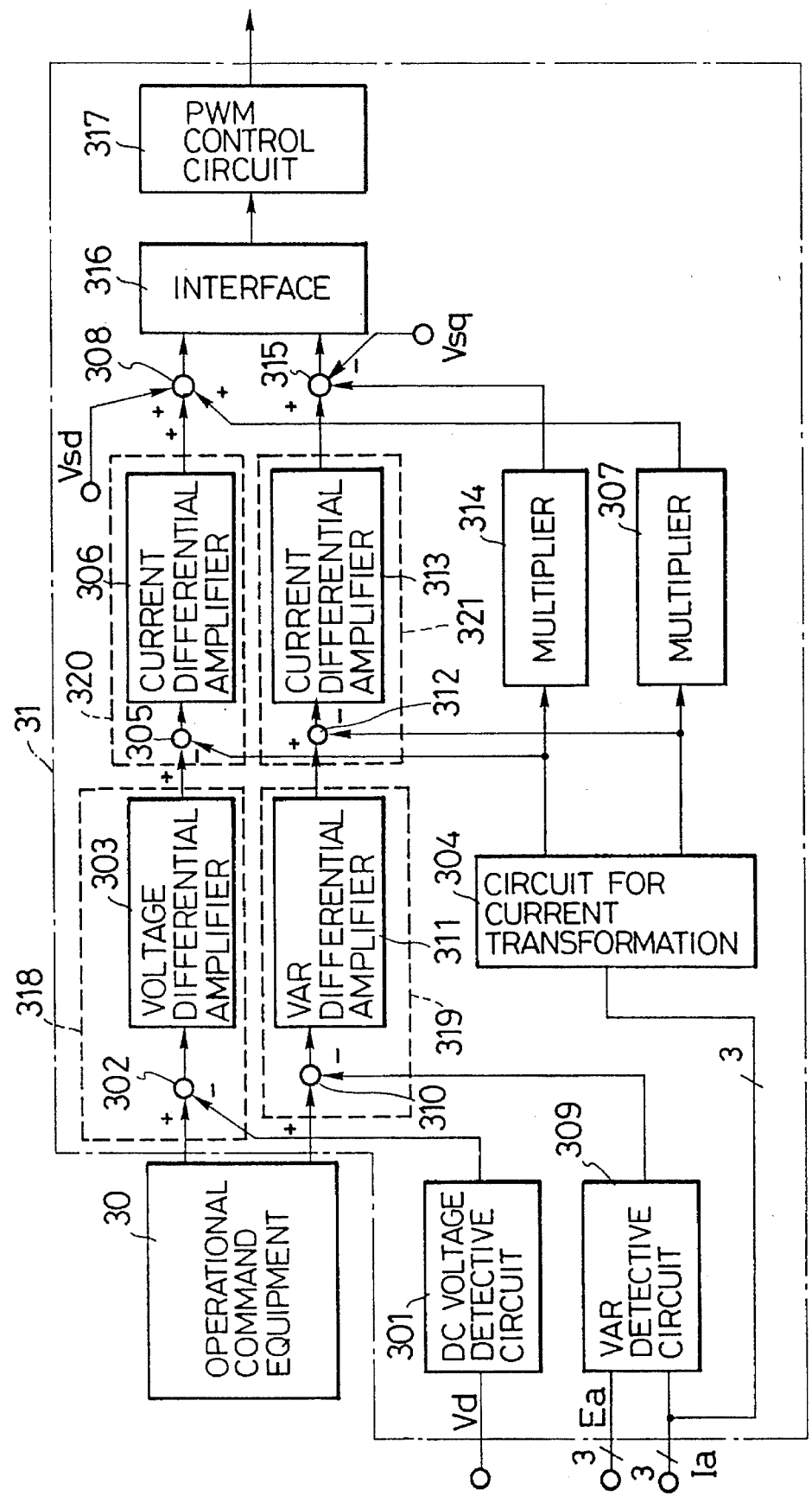
FIG. 3 is a block diagram showing the construction of a control equipment for a rectifier constituted as one equipment of self-commuatated converter shown in FIG. 1.

Next, the detailed construction of the control equipment 31 for the rectifier 3 is shown in FIG. 3. Referring to FIG. 3, a dc voltage command value and a var command value are input to the control equipment 31 from the operation command equipment 30. The dc voltage command value is input, along with an output of adc voltage detective circuit 301 for detecting the dc voltage Vd of the dc system 10, to a constant dc voltage control circuit 318 in which they are added by a built-in adder 302 with signs given as shown. An addition result is amplified by a built-in voltage signal differential amplifier 303 and then output to a constant d-axis current control circuit 320.

The other var command value is input, along with an output of a var detective circuit 309 for calculating the reactive power from the voltage Ea and the current Ia of the ac system, to a constant var control circuit 319 in which they are added by a built-in adder 310 with signs given as shown. An addition result is amplified by a built-in var signal differential amplifier 311 and then output to a constant q-axis current control circuit 321.

Input to an adder 305 in the constant d-axis current control circuit 320 are an output signal from the constant dc voltage control circuit 318 and a d-axis component of the current from a circuit for current transformation 304. An addition result is amplified by a differential current amplifier 306 and then input to an adder 308.

Also, input to an adder 312 in the constant q-axis current control circuit 321 are an output signal from the constant var control circuit 319 and a q-axis component of the current from the circuit for current transformation 304. An addition result is amplified by a current signal differential amplifier 313 and then input to an adder 315.

The circuit for current transformation 304 is a circuit which performs transform of the three-phase ac current Ia input to the control equipment 31 from the ac system 1, into a two-phase current and then performs dq-axis transformation (i.e., rotating axis transformation).

Input to an adder 308 are an output of the constant d-axis current control circuit 320, a signal Vsd representing a d-axis component of the ac system voltage, and an output of a multiplier 307 for addition with signs given as shown. An addition result is output to an interface 316. The multiplier 307 multiplies the q-axis component of the current from the circuit for current transformation 304 by impedance of the converter transformer.

Also, input to an adder 315 are a q-axis component of the ac system voltage signal Vsq, an output of the constant q-axis current control circuit 321 and an output of a multiplier 314 for addition with signs given as shown. An addition result is output to the interface 316. The multiplier 314 multiplies the d-axis component of the current from the circuit for current transformation 304 by impedance of the converter transformer.

The interface 316 transforms an output signal X of the adder 308 and an output signal Y of the adder 315 into an input signal for a PWM (pulse width modulation) control circuit 317 in accordance with the following formulae:

$$k = \sqrt{X^2 + Y^2}$$

$$\theta = \tan^{-1}(X/Y)$$

Based on a magnitude command k and a phase command $\theta$, the PWM control circuit 317 creates a gate pulse for the rectifier 3.

In the above construction, when the active power in the output of the inverter 5 increases, the current flowing through the dc system 10 is reduced to lower the dc voltage. This reduces the output of the dc voltage detective circuit 301, whereupon the output of the adder 302 is increased and so is the output of the voltage signal differential amplifier 303. The increased output of the voltage signal differential amplifier 303 is input to the constant d-axis current control circuit 320 to increase the dc current for raising the dc voltage. Conversely, when the dc voltage is raised, an input value to the constant d-axis current control circuit 320 becomes smaller so that the dc current is reduced to lower the dc voltage. At this time, since the output of the constant var control circuit 319 remains the same, an output value of the constant q-axis current control circuit 321 is not changed and the reactive power on the ac system side of the rectifier 3 is held constant. Thus, the dc voltage is controlled to become constant under a condition that the reactive power is held at a constant value corresponding to the command value.

Figure 4:
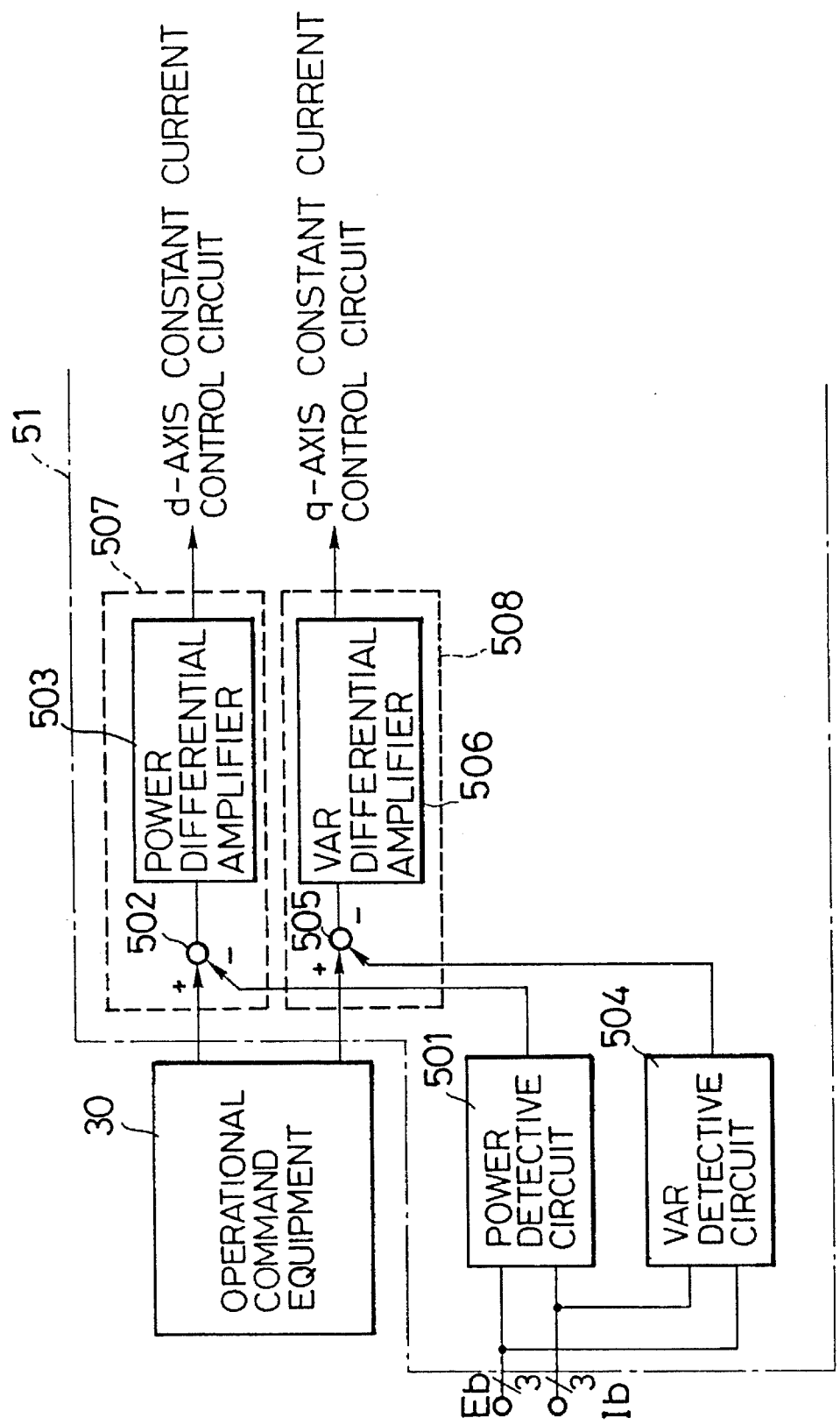
FIG. 4 is a block diagram showing the construction of a command value creating section in a control equipment for an inverter constituted as the other equipment of self-commutated converter shown in FIG. 1.

The control equipment 51 for the inverter 5 is also provided with a circuit similar to the control equipment 31, and FIG. 4 shows a part of the circuit construction of the control equipment 51 which is different from that of the control equipment 31. Command values for two current control circuits corresponding to the constant d-axis current control circuit 320 and the constant q-axis current control circuit 321 are applied from a constant power control circuit 507 for controlling the ac active power to become constant and a constant var control circuit 508 for keeping the ac reactive power constant, respectively, on the inverter side.

Further, in FIG. 4, a active power command value and a var command value are input to the control equipment 51 from the operational command equipment 30. The active power command value is input, along with an output of a power detective circuit 501 for calculating the active power from the ac voltage and the ac current, to a constant power control circuit 507 in which they are added by a built-in adder 502 with signs given as shown. An addition result is amplified by a built-in power signal differential amplifier 503 and then output to a current control circuit corresponding to the constant d-axis current control circuit 320.

The other var command value is input, along with an output of a var detective circuit 504 for calculating the reactive power from the voltage Eb and the current Ib of the ac system on the side of the inverter 5, to a constant var control circuit 508 in which they are added by a built-in adder 505 with signs given as shown. An addition result is amplified by a built-in differential var amplifier 506 and then output to a current control circuit corresponding to the constant q-axis current control circuit 321.

In the above construction, when the power command value for the inverter 5 applied from the operational command equipment 30 increases, the output of the adder 502 is increased and so is the output of the power signal differential amplifier 503. The increased output of the power signal differential amplifier 503 becomes a command value for to current control circuit (not shown) corresponding to the constant d-axis current control circuit 320, to thereby raise the ac output voltage of the inverter 5 for increasing the active power.

Conversely, when the power command value decreases, a command value for the current control circuit corresponding to the constant d-axis current control circuit 320 becomes smaller so that the ac voltage is lowered to reduce the active power. At this time, since the output of the differential var amplifier 504 remains the same, a command value for a current control circuit (not shown) corresponding to the constant q-axis current control circuit 321 is not changed and the reactive power on the output side of the inverter 5 is held constant. Thus, the active power is controlled to become constant under a condition that the reactive power is held at a constant value corresponding to the command value.

A description will be next given of how the rectifier 3 and the inverter 5 are cooperated to stabilize the high voltage dc transmission system by the control equipment 31 for the rectifier 3 and the control equipment 51 for the inverter 5.

It is supposed that the gate pulse is created on the side of the rectifier 3 so as to hold the dc voltage of the dc circuit constant while controlling the reactive power at a constant value, whereas the gate pulse is created on the side of the inverter 5 so as to hold the active power constant while controlling the reactive power at a constant value.

Let now consider a case where the active power in the output of the inverter 5 is instantaneously reduced. In this case, the dc voltage of the dc circuit 10 is raised and the constant dc voltage control circuit 318 in the control equipment 31 for the rectifier 3 is operated so that the active power on the input side of the rectifier 3 is reduced to hold the dc voltage of the dc circuit 10 constant.

On the contrary, when the active power on the output side of the inverter 5 is increased, the dc voltage of the dc system 10 is lowered and the constant dc voltage control circuit 318 in the control equipment 31 for the rectifier 3 is operated so that the active power on the input side of the rectifier 3 is increased to hold the dc voltage of the dc system 10 constant.

Meanwhile, when the active power in the input power to the rectifier 3 is instantaneously reduced and the dc voltage of the dc system 10 is lowered, the ac voltage of the output from the inverter 5 is lowered. Therefore, the active power is transitively reduced and the constant dc voltage control circuit 318 operates so as to suppress a reduction in the dc voltage. However, since the constant power control circuit 507 in the control equipment 51 for the inverter 5 operates to raise the ac voltage of the output and hence prevent a reduction in the active power, the dc voltage is further lowered. As a result, the rectifier 3 operates to increase the output current for suppressing such a further lowering, so that the dc voltage is raised to restore to a stable operating point.

On the contrary, when the active power in the input power to the inverter 3 is increased and the dc voltage of the dc system 10 is raised, the operation proceeds in a reversed manner to the above for similarly restoring to a stable operating point. In this way, the rectifier and the inverter are operated in an cooperative manner to perform stable operation.

There could also be obtained a similar advantage by modifying the control equipment 31 for the rectifier 3 to perform constant power control and constant var control and the control equipment 51 for the inverter 5 to perform constant dc voltage control and constant var control, in opposition to the constant control process mentioned above. In this case, for example, when the active power on the input side of the inverter 3 increases and the dc voltage of the dc system 10 is raised, the control equipment 51 for the inverter 5 operates to increase the active power on the output side of the inverter 5 and suppress an increase in the dc voltage of the dc system 10 for holding the dc voltage of the dc system 10 constant.

On the other hand, when the active power on the input side of the inverter 3 decreases and the dc voltage of the dc system 10 is lowered conversely to the above, the active power on the output side of the inverter 5 is reduced so as to suppress the dc voltage of the dc system 10 from being lowered. Therefore, a constant power control circuit in the control equipment 31 for the rectifier 3 operates to hold the dc voltage at a specified value.

In the above description, one control circuit in each of the control equipment 31 for the rectifier 3 and the control equipment 51 for the inverter 5 is constituted as the constant var control circuit (319, 508). However, since control of the reactive power implies control of the ac system voltage, it is apparent that the constant var control circuit may be replaced by a constant ac system voltage control circuit for holding the ac system voltage constant. In the case, an output of the constant ac system voltage control circuit becomes an input value to the constant q-axis current control circuit 321 or a current control circuit corresponding to the constant q-axis current control circuit 321.

Further, while the above description has been made on the case of performing transformation of a three-phase ac current into two-phase and independently controlling the transformed current per phase, it will be apparent that the present invention is also applicable to a control equipment for such an equipment of self-commutated converter that a three-phase ac voltage and a three-phase ac current are transformed into a two-phase current from which equivalent current signals in two phases are obtained and then controlled independently of each other.

Figure 5:
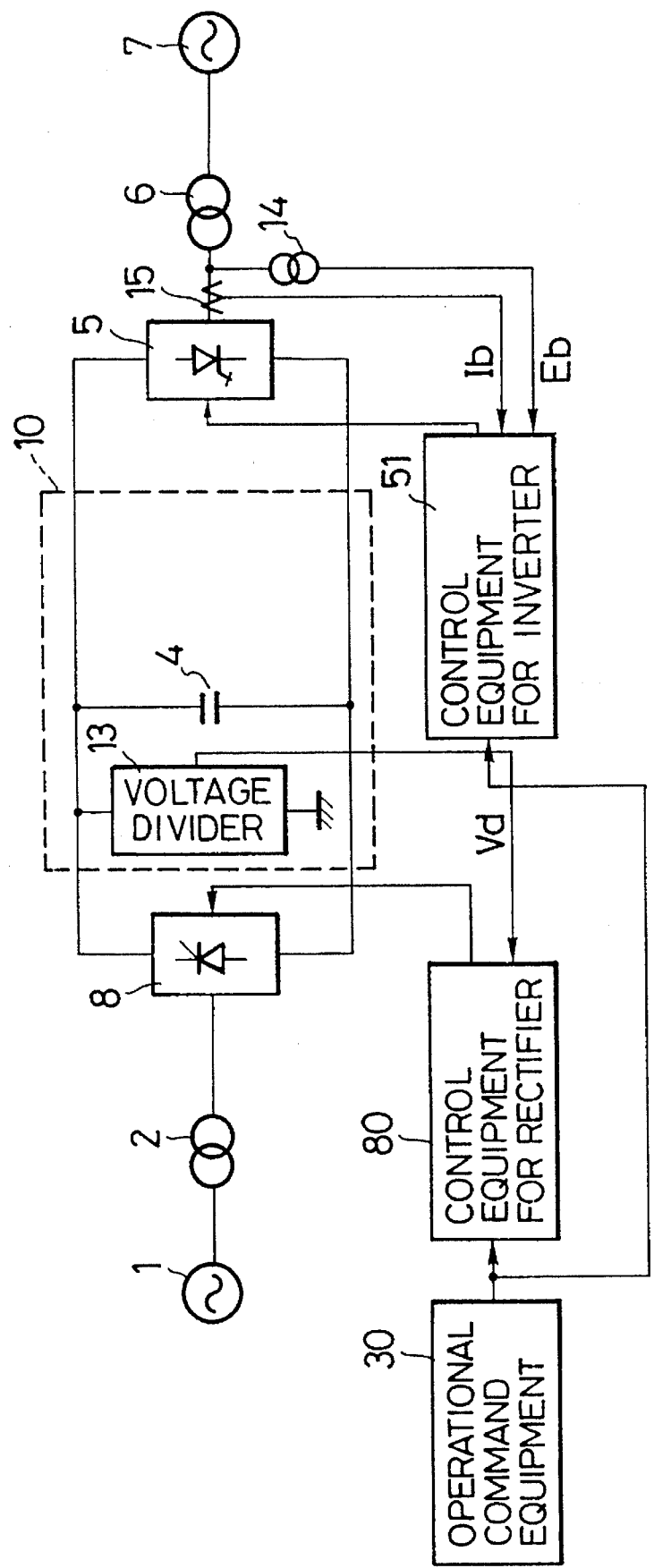
FIG. 5 is a block diagram showing the construction of another embodiment of the high voltage dc transmission system provided with an equipment of self-commutated converter and an equipment of line-commutated converter to which the present invention is applied.

As another embodiment of the present invention, the present control system can also be applied to a case where the rectifier is constituted by a conventional equipment of line-commutated converter. FIG. 5 shows the construction of a high voltage dc transmission system in this case. The same reference numerals as those in FIG. 1 denotes the same components. A description will now be given of those component different from the above embodiment. A rectifier 8 is an equipment of line-commutated converter comprising thyristors with no self-commutating (gate-turn-off) function. The rectifier 8 operates to perform constant dc voltage control, and the inverter 5 operates to perform constant power control and constant var control.

Figure 6:
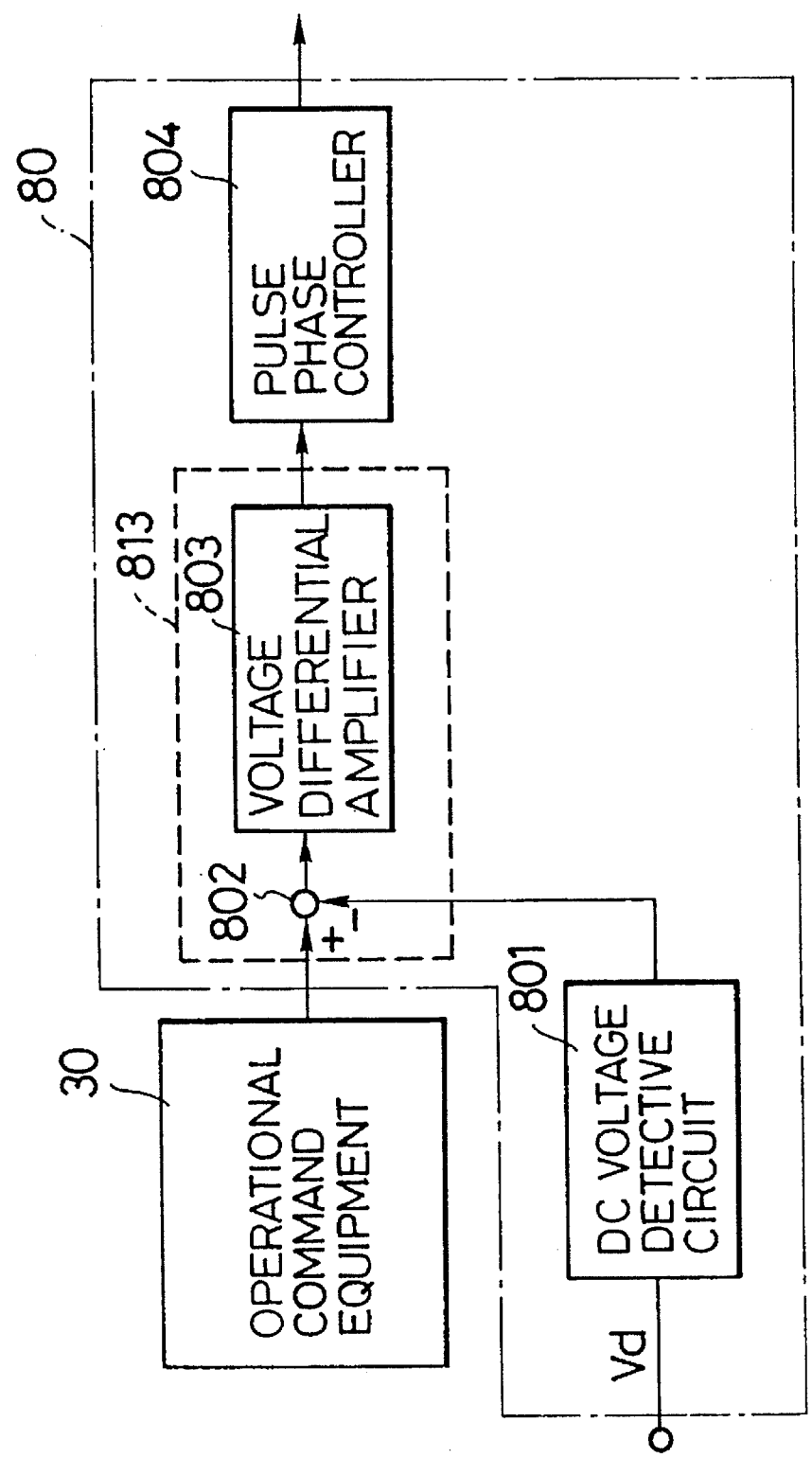
FIG. 6 is a block diagram showing the construction of one embodiment of a control equipment for a line-commutated rectifier shown in FIG. 1.

Next, the construction of a control equipment 80 for the rectifier 8 is shown in FIG. 6. Referring to FIG. 6, a dc voltage command value from the operative command equipment is input, along with an output of adc voltage detective circuit 801 for detecting the dc voltage of the rectifier 80, to an adder 802 in a constant dc voltage control circuit 813. An output of the adder 802 is transmitted via a differential voltage amplifier 803 to a pulse phase controller 804 which outputs a gate pulse for controlling the equipment of line-commutated converter 8.

Because the rectifier being constituted by an equipment of line-commutated converter, this embodiment is different from the embodiment of FIG. 1 except that only the dc voltage can be controlled, but the remaining operation is the same. In this embodiment, the rectifier and the inverter can also be operated in an cooperative manner to perform stable operation.

As an alternative, the arrangement may be such that the rectifier 8 constituted by an equipment of line-commutated converter operates to perform constant power control, and the inverter 5 operates to perform constant dc voltage control and constant var control. The construction of a control equipment for the equipment of line-commutated converter is shown in FIG. 7. Instead of the dc voltage detective circuit 801 for detecting the dc voltage in FIG. 6, there is used a power detective circuit 805 for detecting the active power from the ac voltage Ea and the ac current la. An output of the power detective circuit 805 is input, along with a power command value output from the operational command equipment 30, to an adder 806 in a constant power control circuit 811. An output of the adder 806 si amplified by a differential power amplifier 807 also in the constant power control circuit 811 to become an input value for a constant current control circuit 812. This current command value output from the constant power control circuit 811 is input, along with a dc current detective circuit 80 for detecting the output current of the equipment of line-commutated converter (rectifier) 8, to an adder 809 in a constant current control circuit 812, the resulting difference being amplified by a current signal differential amplifier 810. An output of the current signal differential amplifier 810 is input to the pulse phase controller 804 which produces a gate pulse for operating the equipment of line-commutated converter 8 as the rectifier. Except only that the reactive power cannot be controlled, this embodiment also operates in the same manner as the embodiment shown in FIG. 1. Consequently, the rectifier 8 and the inverter 5 can be operated in an cooperative manner to perform stable operation.

As described above, the present invention makes it possible to stably and efficiently operate a high voltage dc transmission system comprising at least one equipment of self-commutated converters.

What is claimed is:

1. A control equipment for a high voltage direct current (hvdc) transmission system having an equipment of self-commutated converter which comprises switching devices with a self-commutating function and is operated as a rectifier or an inverter, said control equipment comprising:

first control means for controlling a first equipment of self-commutated converter, operated as said rectifier, in such a manner as to hold the dc voltage of a dc system in said high voltage dc transmission system and the reactive power on the input side of said first equipment of self-commutated converter at specified values, and second control means for controlling a second equipment of self-commutated converter, operated as said inverter, in such a manner as to hold the active power and the reactive power on the output side of said second equipment of self-commutated converter at specified values, wherein said first control means includes first current control means for independently controlling each current signal for said first equipment derived from two-phase current signals transformed from three-phase alternating current signals, and said second control means includes second current control means for independently controlling each current signal for said second equipment derived from the two-phase current signals transformed from the three-phase alternating current signals.

2. A control equipment for a high voltage direct current (hvdc) transmission system having an equipment of self-commutated converter which comprises switching devices with a self-commutating function and is operated as a rectifier or an inverter, said control equipment comprising:

first control means for controlling a first equipment of self-commutated converter, operated as said rectifier, in such a manner as to hold the dc voltage of a dc system in said high voltage dc transmission system and the ac system voltage on the input side of said first equipment of self-commutated converter at specified values, and second control means for controlling a second equipment of self-commutated converter, operated as said inverter, in such a manner as to hold the active power and the line voltage of an ac system on the output side of said second equipment of self-commutated converter at specified values, wherein said first control means includes first current control means for independently controlling each current signal for said first equipment derived from two-phase current signals transformed from three-phase alternating current signals, and said second control means includes second current control means for independently controlling each current signal for said second equipment derived from the two-phase current signals transformed from the three-phase alternating current signals.

3. A control equipment for a high voltage direct current (hvdc) transmission system having an equipment of self-commutated converter which comprises switching devices with a self-commutating function and is operated as a rectifier or an inverter, said control equipment comprising:

first control means for controlling a first equipment of self-commutated converter, operated as said rectifier, in such a manner as to hold the active power and the reactive power on the input side of said first equipment of self-commutated converter at specified values, and second control means for controlling a second equipment of self-commutated converter, operated as said inverter, in such a manner as to hold the dc voltage of a dc system in said high voltage dc transmission system and the reactive power on the output side of said second equipment of self-commutated converter at specified values, wherein said first control means includes first current control means for independently controlling each current signal for said first equipment derived from two-phase current signals transformed from three-phase alternating current signals, and said second control means includes second current control means for independently controlling each current signal for said second equipment derived from the two-phase current signals transformed from the three-phase alternating current signals.

4. A control equipment for a high voltage direct current (hvdc) transmission system having an equipment of self-commutated converter which comprises switching devices with a self-commutating function and is operated as a rectifier or an inverter, said control equipment comprising:

first control means for controlling a first equipment of self-commutated converter, operated as said rectifier, in such a manner as to hold the active power and the line voltage of an ac line on the input side of said first equipment of self-commutated converter at specified values, and second control means for controlling a second equipment of self-commutated converter, operated as said inverter, in such a manner as to hold the dc voltage of a dc system in said high voltage dc transmission system and the ac system voltage on the output side of said second equipment of self-commutated converter at specified values, wherein said first control means includes first current control means for independently controlling each current signal for said first equipment derived from two-phase current signals transformed from three-phase alternating current signals, and said second control means includes second current control means for independently controlling each current signal for said second equipment derived from the two-phase current signals transformed from the three-phase alternating current signals.

5. A control equipment for a high voltage direct current (hvdc) transmission system in which a converter equipment operated as a rectifier is constituted by an equipment of line-commutated converter, and a converter equipment operated as a inverter is constituted by an equipment of self-commutated converter which comprises switching devices with a self-commutating function, said control equipment comprising:

first control means for controlling a first equipment of line-commutated converter, operated as a rectifier, in such a manner as to hold the dc voltage of a dc system in said high voltage dc transmission system at a specified value, and second control means for controlling said equipment of self-commutated converter, operated as an inverter, in such a manner as to hold the active power and the reactive power on the output side of said equipment of self-commutated converter at a specified value, wherein said first control means includes first current control means for independently controlling each current signal for said first equipment derived from two-phase current signals transformed from three-phase alternating current signals, and said second control means includes second current control means for independently controlling each current signal for said equipment of self-commutated converter derived from the two-phase current signals transformed from the three-phase alternating current signals.

6. A control equipment for a high voltage direct current (hvdc) transmission system in which a converter equipment operated as a rectifier is constituted by an equipment of line-commutated converter, and a converter equipment operated as a inverter is constituted by an equipment of self-commutated converter which comprises switching devices with a self-commutating function, said control equipment comprising:

first control means for controlling said equipment of line-commutated converter, operated as a rectifier, in such a manner to hold the dc voltage of a dc system in said high voltage dc transmission system at specified values, and second control means for controlling said equipment of self-commutated converter, operated as an inverter, in such a manner as to hold the active power and the line voltage of an ac line on the output side of said equipment of self-commutated converter at a specified value, wherein said first control means includes first current control means for independently controlling each current signal for said equipment of line-commutated converter derived from two-phase current signals transformed from three-phase alternating current signals, and said second control means includes second current control means for independently controlling each current signal for said equipment of self-commutated converter derived from the two-phase current signals transformed from the three-phase alternating current signals.

7. A control equipment for a high voltage direct current (hvdc) transmission system in which a converter equipment operated as a rectifier is constituted by an equipment of line-commutated converter, and a converter equipment operated as a inverter is constituted by an equipment of self-commutated converter which comprises switching devices with a self-commutating function, said control equipment comprising:

first control means for controlling said equipment of line-commutated converter, operated as a rectifier, in such a manner as to hold the active power on the input side of said equipment of line-commutated converter at a specified value, and second control means for controlling said equipment of self-commutated converter, operated as an inverter, in such a manner as to hold the dc voltage of a dc system in said high voltage dc transmission system and the reactive power on the output side of said equipment of self-commutated converter at specified values, wherein said first control means includes first current control means for independently controlling each current signal for said equipment of line-commutated converter derived from two-phase current signals transformed from three-phase alternating current signals, and said second control means includes second current control means for independently controlling each current signal for said equipment of self-commutated converter derived from the two-phase current signals transformed from the three-phase alternating current signals.

8. A control equipment for a high voltage direct current (hvdc) transmission system in which a converter equipment operated as a rectifier is constituted by an equipment of line-commutated converter, and a converter equipment operated as a inverter is constituted by an equipment of self-commutated converter which comprises switching devices with a self-commutating function, said control equipment comprising:

first control means for controlling said equipment of line-commutated converter, operated as a rectifier, in such a manner as to hold the active power on the input side of said equipment of line-commutated converter at a specified value, and second control means for controlling said equipment of self-commutated converter, operated as an inverter, in such a manner as to hold the dc voltage of a dc system in said high voltage dc transmission system and the ac system voltage on the output side of said equipment of self-commutated converter at specified values, wherein said first control means includes first current control means for independently controlling each current signal for said equipment of line-commutated converter derived from two-phase current signals transformed from three-phase alternating current signals, and said second control means includes second current control means for independently controlling each current signal for said equipment of self-commutated converter derived from the two-phase current signals transformed from the three-phase alternating current signals.

9. A control equipment for a high voltage direct current (hvdc) transmission system having an equipment of self-commutated converter which comprises switching devices with a self-commutating function and is operated as a rectifier or an inverter, said control equipment comprising:

first control means for controlling a first equipment of self-commutated converter, operated as said rectifier, in such a manner as to hold the dc voltage of a dc system in said high voltage dc transmission system and the reactive power on the input side of said first equipment of self-commutated converter at specified values, and second control means for controlling a second equipment of self-commutated converter, operated as said inverter, in such a manner as to hold the active power and the reactive power on the output side of said second equipment of self-commutated converter at specified values, wherein said first control means comprises dc voltage control means for amplifying a difference between said specified value of the dc voltage applied from input means and a detected output from dc voltage detective means, d-axis current control means for amplifying a difference between an output of said dc voltage control means and a d-axis current output resulted from transformation of a three-phase ac current into two-phase, an adder for adding a d-axis component of ac system voltage signal (Vsd) on the side of said rectifier, an output of said d-axis current control means, and a voltage-converted output of a q-axis current output resulted from said transformation into two-phase, reactive power control means for amplifying a difference between said specified value of the reactive power applied from said input means and a detected output from reactive power detective means, q-axis current control means for amplifying a difference between an output of said reactive power control means and said q-axis current output, an adder for adding a q-axis component of an ac system voltage signal (Vsq) on the side of said rectifier, an output of said q-axis current control means and a voltage-converted output of said d-axis current output, and a PWM control circuit for creating a gate pulse for said rectifier from output signals of both said adders, and wherein said second control means comprises active power control means for amplifying a difference between said specified value of the active power applied from said input means and a detected output from active power detective means, d-axis current control means for amplifying a difference between an output of said active power control means and a d-axis current output resulted from transformation of a three-phase ac current into two-phase, an adder for adding a d-axis component of the ac system voltage signal (Vsd) on the side of said inverter, an output of said d-axis current control means, and a voltage-converted output of a q-axis current output resulted from said transformation into two-phase, reactive power control means for amplifying a difference between said specified value of the reactive power applied from said input means and a detected output from reactive power detective means, q-axis current control means for amplifying a difference between an output of said reactive power control means and said q-axis current output, an adder for adding a q-axis component of the ac system voltage signal (Vsq), an output of said q-axis current control means and the voltage-converted output of said d-axis current output, and a PWM control circuit for creating a gate pulse for said inverter from output signals of both said adders.

10. The control equipment for a high voltage direct current transmission system of claim 1, wherein said first current control means for controlling said first equipment uses three-phase alternating current signals and three-phase alternating current voltage signals of an alternating current power and derives two-phase current signals transformed from said three-phase alternating current signals, and said second current control means for controlling said second equipment uses three-phase alternating current signals and three-phase alternating current voltage signals of an alternating current power and derives two-phase current signals transformed from said three-phase alternating current signals.

11. The control equipment for a high voltage direct current transmission system of claim 2, wherein said first current control means for controlling said first equipment uses three-phase alternating current signals and three-phase alternating current voltage signals of an alternating current power and derives two-phase current signals transformed from said three-phase alternating current signals, and said second current control means for controlling said second equipment uses three-phase alternating current signals and three-phase alternating current voltage signals of an alternating current power and derives two-phase current signals transformed from said three-phase alternating current signals.

12. The control equipment for a high voltage direct current transmission system of claim 3, wherein said first current control means for controlling said first equipment uses three-phase alternating current signals and three-phase alternating current voltage signals of an alternating current power and derives two-phase current signals transformed from said three-phase alternating current signals, and said second current control means for controlling said second equipment uses three-phase alternating current signals and three-phase alternating current voltage signals of an alternating current power and derives two-phase current signals transformed from said three-phase alternating current signals.

13. The control equipment for a high voltage direct current transmission system of claim 4, wherein said first current control means for controlling said first equipment uses three-phase alternating current signals and three-phase alternating current voltage signals of an alternating current power and derives two-phase current signals transformed from said three-phase alternating current signals, and said second current control means for controlling said second equipment uses three-phase alternating current signals and three-phase alternating current voltage signals of an alternating current power and derives two-phase current signals transformed from said three-phase alternating current signals.

14. The control equipment for a high voltage direct current transmission system of claim 5, wherein said first current control means for controlling said first equipment uses three-phase alternating current signals and three-phase alternating current voltage signals of an alternating current power and derives two-phase current signals transformed from said three-phase alternating current signals, and said second current control means for controlling said equipment of self-commutated converter uses three-phase alternating current signals and three-phase alternating current voltage signals of an alternating current power and derives two-phase current signals transformed from said three-phase alternating current signals.

15. The control equipment for a high voltage direct current transmission system of claim 6, wherein said first current control means for controlling said equipment of line-commutated converter uses three-phase alternating current signals and three-phase alternating current voltage signals of an alternating current power and derives two-phase current signals transformed from said three-phase alternating current signals, and said second current control means for controlling said equipment of self-commutated converter uses three-phase alternating current signals and three-phase alternating current voltage signals of an alternating current power and derives two-phase current signals transformed from said three-phase alternating current signals.

16. The control equipment for a high voltage direct current transmission system of claim 7, wherein said first current control means for controlling said equipment of line-commutated converter uses three-phase alternating current signals and three-phase alternating current voltage signals of an alternating current power and derives two-phase current signals transformed from said three-phase alternating current signals, and said second current control means for controlling said equipment of self-commutated converter uses three-phase alternating current signals and three-phase alternating current voltage signals of an alternating current power and derives two-phase current signals transformed from said three-phase alternating current signals.

17. The control equipment for a high voltage direct current transmission system of claim 8, wherein said first current control means for controlling said equipment of line-commutated converter uses three-phase alternating current signals and three-phase alternating current voltage signals of an alternating current power and derives two-phase current signals transformed from said three-phase alternating current signals, and said second current control means for controlling said equipment of self-commutated converter uses three-phase alternating current signals and three-phase alternating current voltage signals of an alternating current power and derives two-phase current signals transformed from said three-phase alternating current signals.

* * * * *